US010708308B2

(12) United States Patent
DiCorpo et al.

(10) Patent No.: US 10,708,308 B2
(45) Date of Patent: Jul. 7, 2020

(54) AUTOMATED MITIGATION OF ELECTRONIC MESSAGE BASED SECURITY THREATS

(71) Applicant: ServiceNow, Inc., Santa Clara, CA (US)

(72) Inventors: Phillip DiCorpo, San Francisco, CA (US); Jose Bernal, Santa Clara, CA (US); Eun-Sook Watson, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 152 days.

(21) Appl. No.: 15/722,966

(22) Filed: Oct. 2, 2017

(65) Prior Publication Data

US 2019/0104155 A1 Apr. 4, 2019

(51) Int. Cl.
*H04L 29/06* (2006.01)
*G06F 16/951* (2019.01)
(Continued)

(52) U.S. Cl.
CPC ............ *H04L 63/20* (2013.01); *G06F 16/951* (2019.01); *G06F 21/56* (2013.01); *H04L 51/12* (2013.01); *H04L 63/0236* (2013.01); *H04L 63/0281* (2013.01); *H04L 63/145* (2013.01); *H04L 63/1416* (2013.01); *H04L 63/1483* (2013.01); *H04L 51/08* (2013.01)

(58) Field of Classification Search
CPC combination set(s) only.
See application file for complete search history.

(56) References Cited

U.S. PATENT DOCUMENTS 8,392,357 B1 3/2013 Zou et al.
8,578,166 B2 11/2013 De Monseignat et al.
(Continued)

FOREIGN PATENT DOCUMENTS

JP 2009089001 A 4/2009
JP 2013175238 A 9/2013

OTHER PUBLICATIONS

Canadian Office Action for Canadian Patent Application No. 2990435 dated Oct. 22, 2018; 5 pgs.
(Continued)

*Primary Examiner* — Minh Dinh
(74) *Attorney, Agent, or Firm* — Fletcher Yoder P.C.

(57) ABSTRACT

An example embodiment may include a security enforcement point device disposed within a managed network and a security decision point device disposed within a computational instance of a remote network management platform. The security decision point device may be configured to: receive a message by way of the managed network; parse the message to identify observable indicators of one or more of the security threats, where the observable indicators include at least one of a network addresses, a hyperlink, or a representation of an attached file; remotely query a security threat database for the observable indicators; receive, from the security threat database, an indication that the observable indicators are associated with a particular security threat, and transmit, to the security enforcement point device, a command to update its associated security policy such that the particular security threat is mitigated.

17 Claims, 11 Drawing Sheets

(51) Int. Cl.
  *H04L 12/58* (2006.01)
  *G06F 21/56* (2013.01)

(56) References Cited

U.S. PATENT DOCUMENTS

| | | |
|---|---|---|
| 8,719,364 B2 | 5/2014 | Kita et al. |
| 2005/0262566 A1* | 11/2005 | Gassoway ............. G06F 21/564 726/24 |
| 2007/0079379 A1* | 4/2007 | Sprosts ................ G06Q 10/107 726/24 |
| 2009/0006532 A1 | 1/2009 | Sinn et al. |
| 2009/0037546 A1 | 2/2009 | Kirsch |
| 2009/0182818 A1* | 7/2009 | Krywaniuk ............. H04L 51/12 709/206 |
| 2011/0314546 A1* | 12/2011 | Aziz ....................... G06F 21/56 726/24 |
| 2016/0269427 A1 | 9/2016 | Haugsnes |
| 2016/0301705 A1 | 10/2016 | Higbee et al. |
| 2016/0344770 A1 | 11/2016 | Verma et al. |
| 2017/0171231 A1 | 6/2017 | Reybok et al. |
| 2017/0223046 A1* | 8/2017 | Singh .................... H04L 43/062 |
| 2017/0230411 A1 | 8/2017 | Starink et al. |
| 2017/0244736 A1 | 8/2017 | Benishti |

OTHER PUBLICATIONS

First Action Interview Action for U.S. Appl. No. 15/939,676 dated Jun. 1, 2018; 4 pgs.
Extended European Search Report for European Application No. 17211047.0 dated Jul. 3, 2018; 9 pgs.

\* cited by examiner

AUTOMATED MITIGATION OF ELECTRONIC MESSAGE BASED SECURITY THREATS

BACKGROUND

Email phishing attacks have become one of the most prevalent vectors for the illicit acquisition of sensitive private information as well as the introduction of malware into computing devices. Successfully detecting phishing attacks can be challenging, especially since the line between email spam and phishing can be quite thin. With new phishing threats emerging and evolving on a regular basis, it is difficult to educate users of email services to respond properly when they believe that they may have received an email containing a phishing attack. Therefore, taking measures to automate the detection and containment of these threats can be beneficial.

SUMMARY

Phishing attacks typically take the form of email messages sent to a large number of users. Such an email message may contain text or images that seek to have the users take a specific action. This action may be referencing a hyperlink, such as a uniform resource locator (URL). The hyperlink may lead to a counterfeit web site that mimics the appearance of an actual web site and encourages the users to enter sensitive private information (e.g., userids and passwords). Alternatively or additionally, the action may be for the user to download an attachment contained within or associated with the email message. The attachment may include an executable file that, when activated, installs malware on the user's computing device.

Regardless of the exact methods used, the impact of phishing attacks can be devastating to individuals and enterprises. In addition to potential financial loss, hundreds or thousands of person hours may be spent determining the extent of a phishing attack, identifying compromised devices, and containing and eradicating the threat. Thus, any technique that can be used to improve the detection of and responses to phishing attacks can be beneficial.

Particularly, in enterprises and other organizations, users may be encouraged to report suspected phishing attacks to security professionals. For instance, a user may suspect that an email message that he or she received is a phishing attack. The user may forward the email message to a pre-established mailbox. The security professionals may review email messages in this mailbox to determine whether the suspected phishing attack is an actual threat. If this is the case, the security professional may assess the extent of the attack. This may involve establishing how many other users received the same or a similar phishing attack, whether any of these users took any of the actions associated with the phishing attack, assessing the impact of these actions, and updating security policies on security enforcement points (e.g., firewalls, email servers, intrusion detection systems, intrusion prevention systems, and/or anti-malware applications operating on endpoint devices) to mitigate or eradicate the effect of the phishing attack.

This process can take hours or days, even for a seasoned security professional. During such a time period, the attack can spread unchecked, interrupting the proper function of tens, hundreds, or thousands of devices. Clearly, any technical solution that reduces the timeframe of detection, containment, and eradication of these threats is welcome, and perhaps necessary to protect against previously unseen attacks.

The embodiments herein provide technical improvements to how phishing attacks are detected, assessed, and mitigated in a managed network. When a possible phishing attack is detected (e.g., reported by a user or automatically detected), a copy of the suspect email message is transmitted to an email account or another destination. Once received, the suspect email message is scanned for observable indicators of phishing. These may include certain patterns or inconsistencies in the suspect email's headers, links to particular URLs in the suspect email message's body, and/or certain attachments contained in the suspect email message. If it is determined that the observable indicators are associated with phishing attacks, updated security policies may be provided to one or more security enforcement points within the managed network so that future email messages with the same or similar observable indicators do not reach users' email inboxes. If it is determined that the observable indicators are not associated with phishing attacks, an updated policy may be provided to an email spam filter on the managed network. This way, future spam emails are less likely to be delivered to users' email inboxes. Thus, these embodiments also reduce "noise" for security personnel and help focus their resources on real and imminent threats.

Accordingly, a first example embodiment may involve a security enforcement point device disposed within a managed network, where the security enforcement point device applies security policies to protect computing devices on the managed network from security threats. The first example embodiment may also involve a security decision point device disposed within a computational instance of a remote network management platform, where the computational instance is dedicated to serving the managed network. The security decision point device may also be configured to: receive a message by way of the managed network, where the message was obtained by a particular computing device of the computing devices; parse the message to identify observable indicators of one or more of the security threats, where the observable indicators include at least one of a network addresses, a hyperlink, or a representation of an attached file; remotely query a security threat database for the observable indicators; receive, from the security threat database, an indication that the observable indicators are associated with a particular security threat; and transmit, to the security enforcement point device, a command to update its associated security policy such that the particular security threat is mitigated, where reception of the command causes the security enforcement point device to change operation to be in accordance with the updated security policy.

A second example embodiment may involve receiving, at a security decision point device disposed within a computational instance of a remote network management platform, a message by way of a managed network, where the message was obtained by a particular computing device disposed within the managed network, and where the computational instance is dedicated to serving the managed network. The second example embodiment may also involve parsing, by the security decision point device, the message to identify observable indicators of one or more of the security threats, where the observable indicators include at least one of a network addresses, a hyperlink, or a representation of an attached file. The second example embodiment may also involve remotely querying, by the security decision point device, a security threat database for the observable indicators. The second example embodiment may also involve receiving, by the security decision point device and from the security threat database, an indication that the observable indicators are associated with a particular security threat. The second example embodiment may also involve transmitting, by the security decision point device and to a security enforcement point device disposed within the managed network, a command to update a security policy of the security enforcement point device such that the particular security threat is mitigated, where reception of the command causes the security enforcement point device to change operation to be in accordance with the updated security policy.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
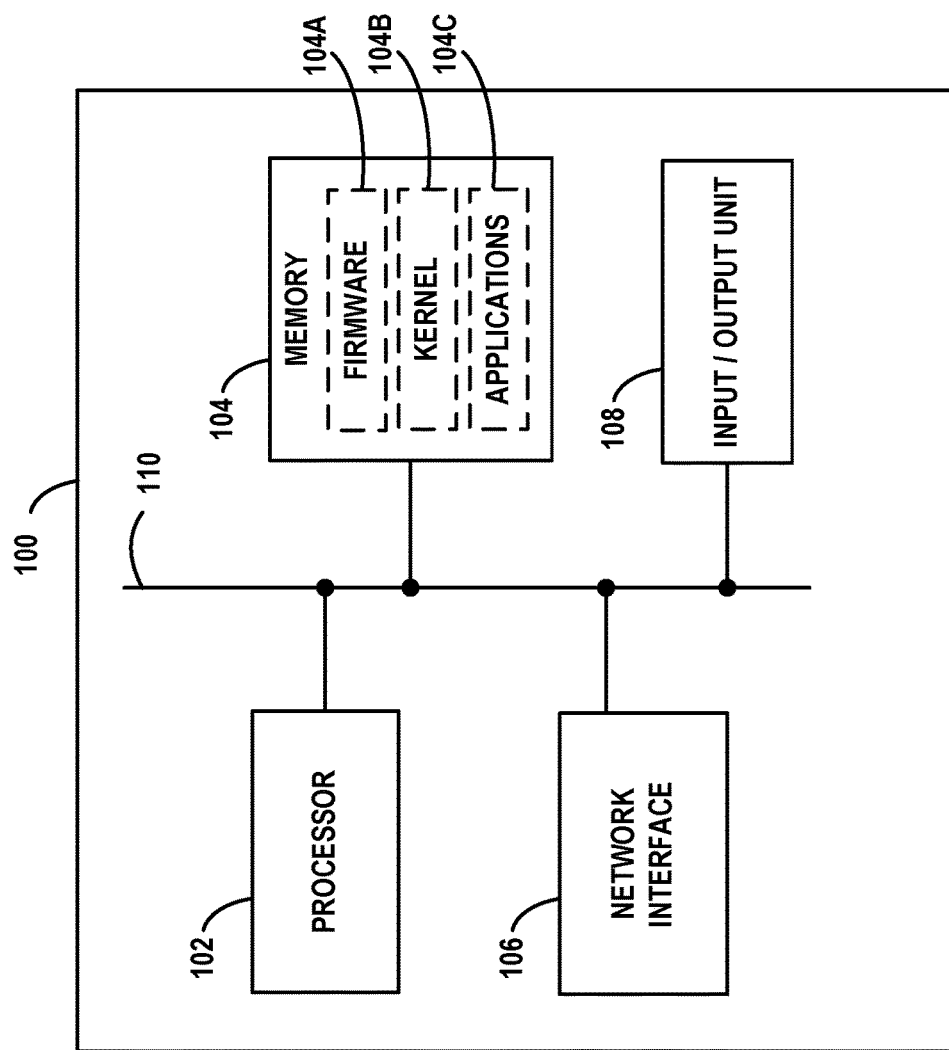
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
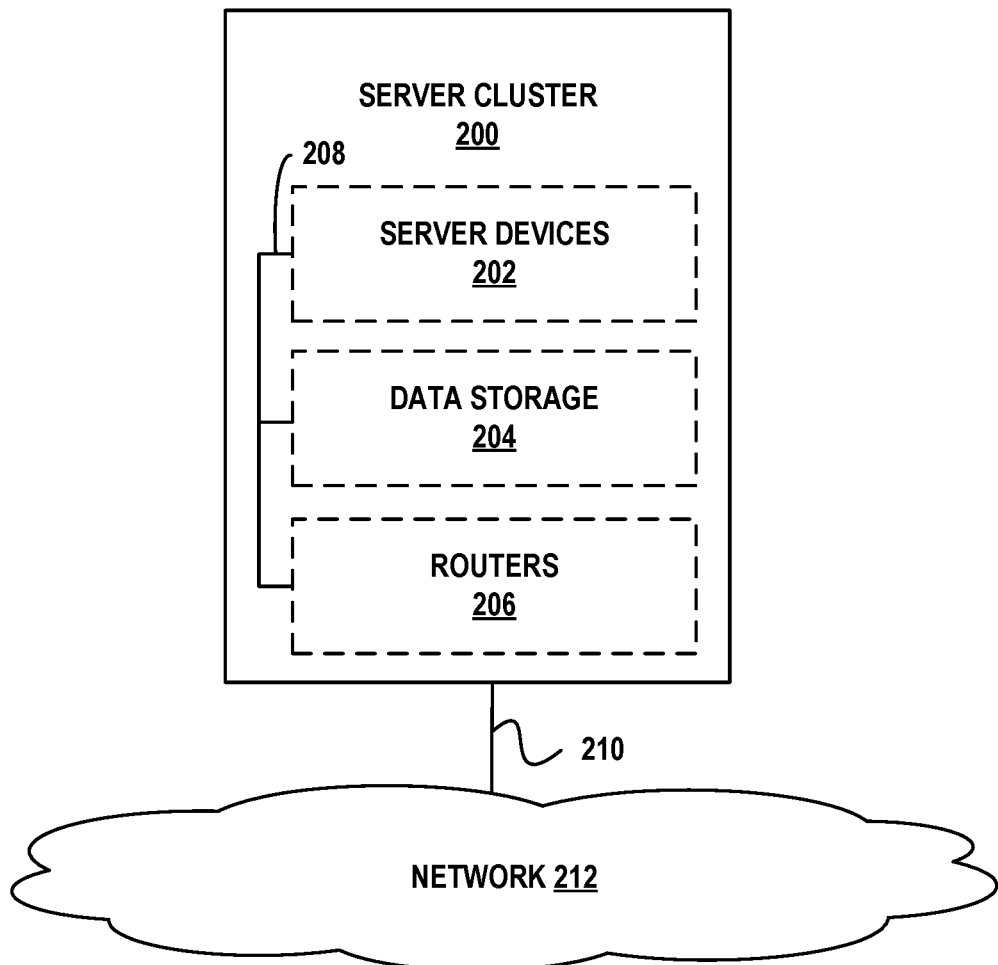
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
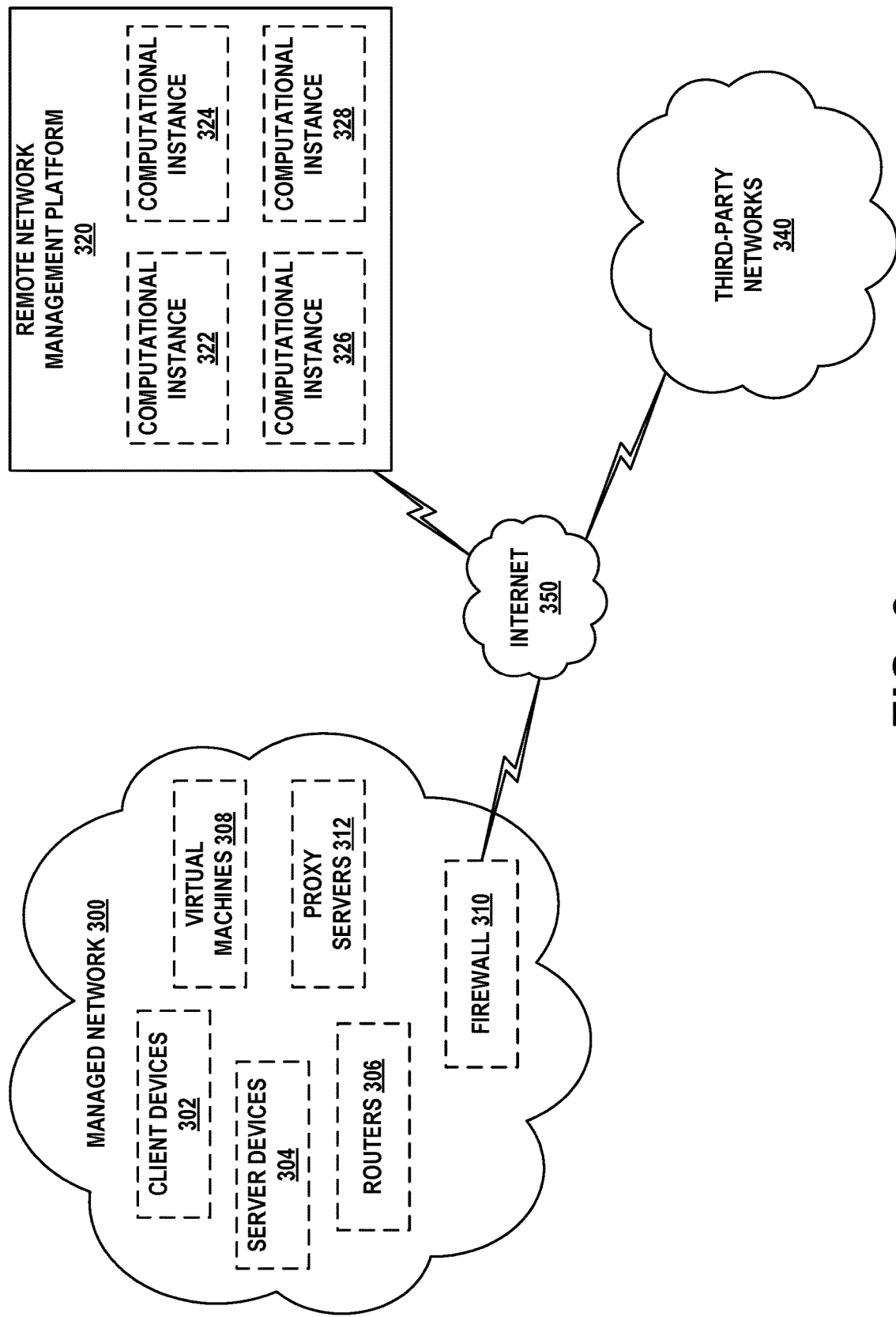
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation.

Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
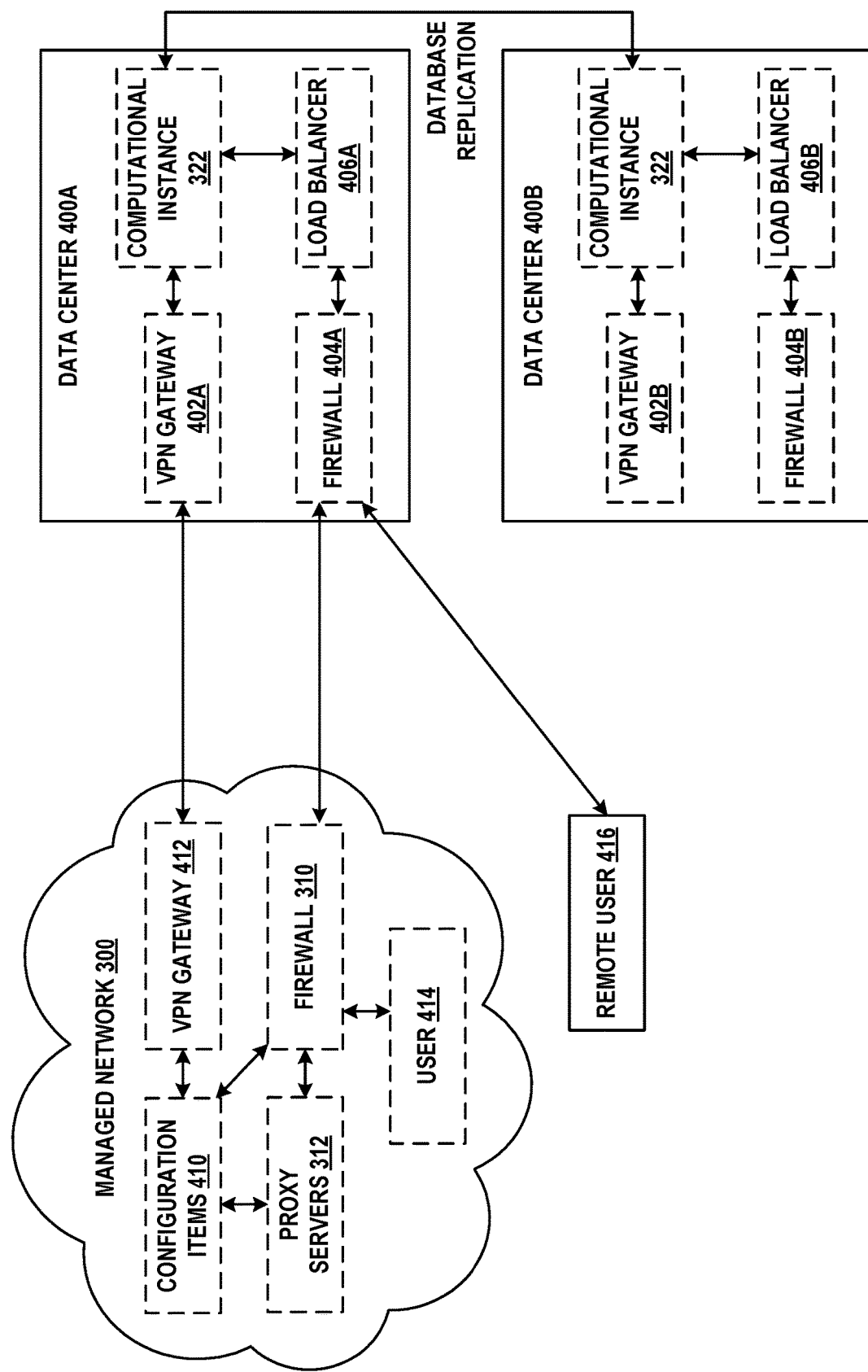
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
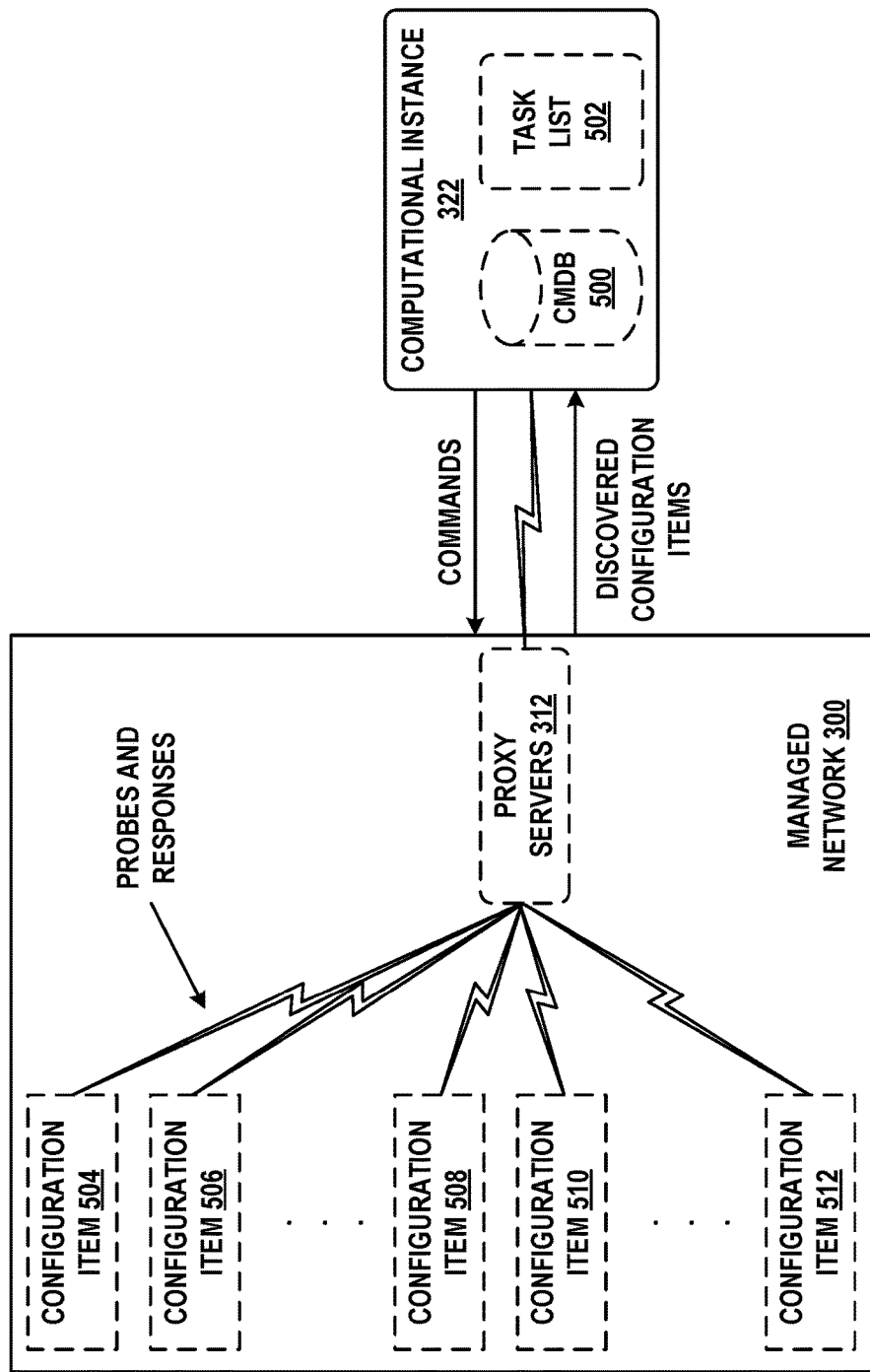
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
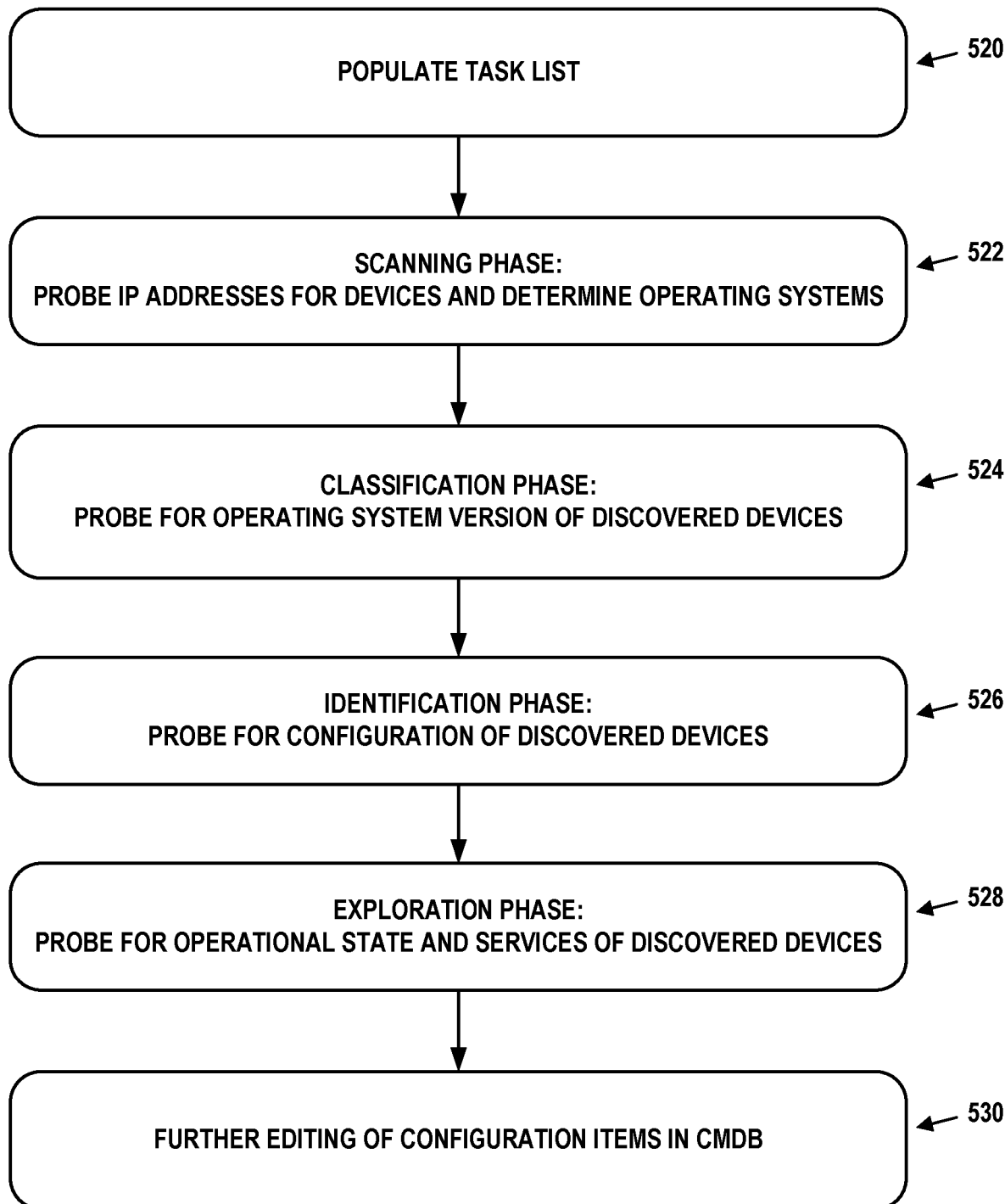
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE EMAIL MESSAGE FORMATS AND INDICATORS OF PHISHING ATTACKS

As discussed above, a managed network may host dozens, hundreds, or thousands of computing devices that serve a similar number of users. One of the most prevalent network services for managed networks is email. Users on a managed network may receive dozens of email messages per day from other users of the managed network, as well as from sources outside of the managed network.

In recent years, phishing has become a prevalent, and somewhat effective, method of cybercrime. A phishing attack involves sending a number of users (usually a large number of users, some of whom may be specifically targeted in "spear phishing" attacks) email messages that appear to be legitimate alerts or requests for information. In some cases, the phishing emails include hyperlinks to a fake web site that mimics the appearance and functionality of a real web site. The user is encouraged to enter sensitive private information, such as userids, passwords, credit card numbers, social security numbers, and so on, into the fake web site. Some phishing attacks include attachments in the phishing emails that, when downloaded to a computing device and executed, deploy malware on that computing device. This malware may search the computing device for sensitive private information to transmit to the attacker, and may attempt to scan the managed network for opportunities to spread to other devices.

Clearly, it is important to rapidly mitigate the threat of phishing attacks, especially on managed networks where a large number of users and devices can be impacted. But in order to do so, an understanding of the format and content of email messages can be helpful. With this understanding, attention can be focused on the parts of email messages that are most likely indicative of whether the email messages are phishing attacks.

For purpose of illustration, many of the embodiments described herein focus on phishing attacks that use email messages to reach users. It is possible, however, for phishing attacks to use other mechanisms. Short message service (SMS) messages, as well as instant messaging (IM) messages and group chat messages can be used as well. Thus, the embodiments herein are not limited to email messages.

Figure 6A:
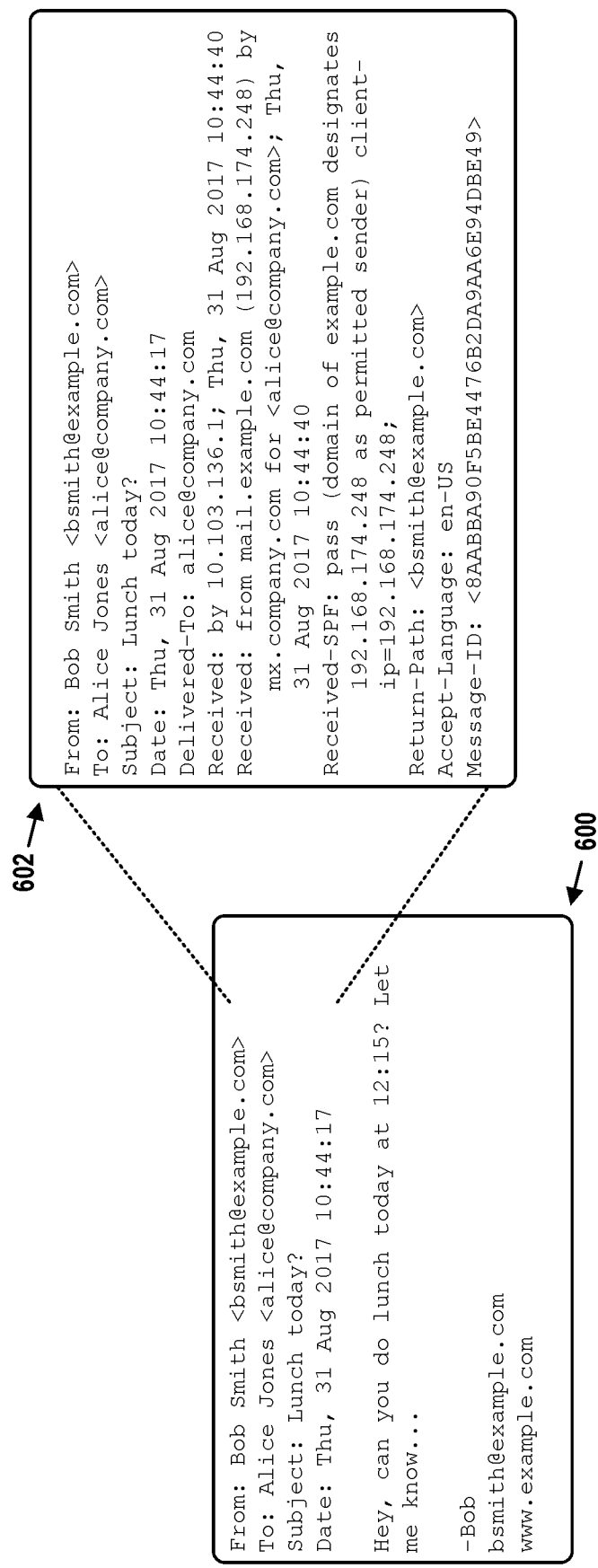
FIG. 6A is an example electronic message and headers, in accordance with example embodiments.

FIG. 6A shows display 600 of an example email message. Display 600 illustrates how a typical email client application may present an email message to a user. The top four lines of the email message contain the "From", "To", "Subject", and "Date" headers, respectively. These headers indicate the putative sender (Bob Smith with an email address of bsmith@example.com), putative recipient (Alice Jones with an email address of alice@company.com), putative subject of the email ("Lunch today?"), and the putative time and date at which the email message was sent (Thursday, Aug. 31, 2017 at 10:44:17 AM). The remainder of this particular email message is its body, which is a message, allegedly from Bob Smith to Alice Jones, asking her if they could meet for lunch at 12:15. There are no attachments.

Consistent with how email client applications present email messages, not all information in the actual email message is shown in display 600. In particular, an email message often contains numerous headers with additional information, as shown in display 602. The first four lines of display 602 include the four headers shown in display 600. But display 602 also includes further headers that provide valuable information that can be used to infer whether an email message is a phishing attack.

For example, the "Delivered-To" header indicates the email address to which the email message was delivered. This header is followed by two "Received" headers. Each "Received" header is added by an email server, gateway or relay that forwards the email message on to its destination, or is the final destination of the email message.

For instance, the first "Received" header in display 602 indicates that a device with IP address 10.103.136.1 received the email message on Thursday, Aug. 31, 2017 at 10:44:40. This device is likely the ultimate destination email server that provides the email message to a client device.

The second "Received" header indicates that a device with domain name mx.company.com received the email message on Thursday, Aug. 31, 2017 at 10:44:40 from a device with domain name mail.example.com and IP address 192.168.174.248. This header also indicates that the recipient of the message was specified as alice@company.com.

The information in both of the "Received" headers suggests that the email message was transmitted by mail.example.com to mx.company.com in order to be delivered to alice@company.com. Then, mx.company.com forwarded the email message to the device with IP address 10.103.136.1 for actual delivery to Alice Jones's inbox. There may be several "Received" headers in an email message, and these may appear in any order.

The "Received-SPF" header provides the result of a sender policy framework (SPF) lookup of the putative sending host. SPF is a validation technique for detecting whether an email message has been transmitted from a domain by a host authorized to do so. Each domain may store a list of authorized sending hosts in DNS records for that domain. Phishing attacks often use forged "From" addresses, so checking SPF records can be used to detect these efforts. Thus, the "Received-SPF" header in display 602 indicates that the SPF check has passed, because "example.com designates 192.168.174.248 as permitted sender."

The "Return-Path" header gives the email address of Bob Smith, bsmith@example.com. In general, this header is set to a value provided by the sending system as an email bounce address—email address to which undeliverable emails should be transmitted.

The final two headers, "Accept-Language" and "Message-ID" specify the language to be used in responses, and a unique identifier of the email message, respectfully. Both are typically set by the sender of the email message.

An email message may contain numerous headers, and only examples thereof are displayed in FIG. 6A. Some of these headers may be placed in the email message by an email server associated with the sender. Others may be placed in the email message by intermediate email servers or an email server associated with the recipient. In general, an email server can insert or overwrite almost any header when it is generating, transmitting, or receiving an email message. Thus, email messages are particularly vulnerable to fraud and/or spoofing attacks that involve falsified header information.

From the information in these headers, and well as that of the body, an estimation of whether the email message is a phishing attack can be made. But in order to appreciate the procedures for doing so, it is helpful to consider an example email that contains such an attack.

Figure 6B:
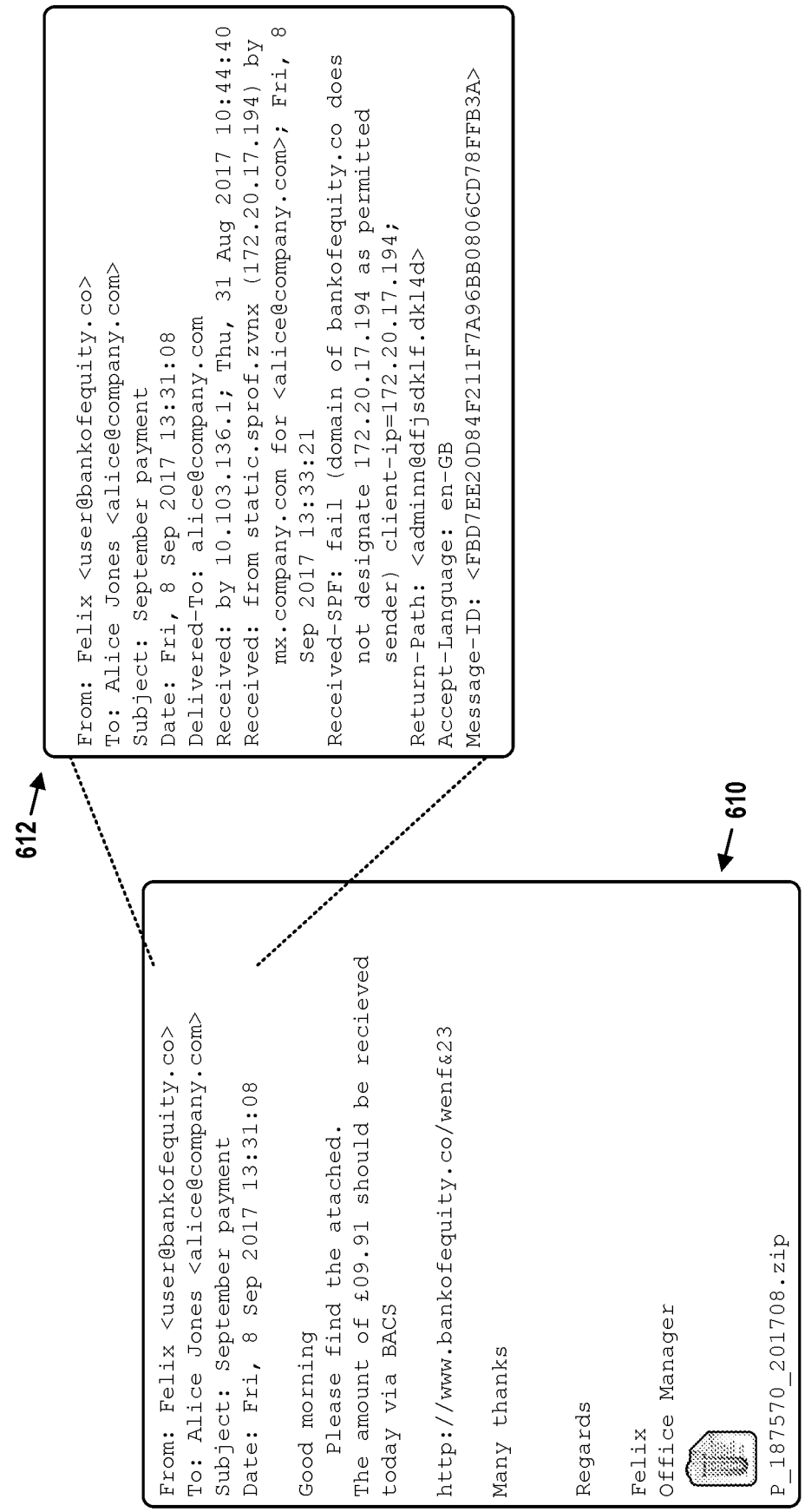
FIG. 6B is another example electronic message and headers, in accordance with example embodiments.

FIG. 6B shows display 610 of another example email message. Display 610 also illustrates how a typical email client application may present an email message to a user.

The headers shown in display 610 indicate the putative sender (Felix with an email address of user@bankofequity.co), putative recipient (Alice Jones with an email address of alice@company.com), putative subject of the email ("September payment"), and the putative time and date at which the email message was sent (Friday, Sep. 8, 2017 at 1:31:08 PM). The remainder of this particular email message is its body, which is a message supposedly requesting a payment of 9.91 British pounds. The email message also contains an attachment. This attachment has a file name extension that suggests that it is a zip file containing one or more compressed files.

Display 612 shows additional headers for the email message. Most notably, the second "Received" header indicates that mx.company.com received the email message from the domain static.sprof.zvnx, which has an IP address of 172.20.17.194. However, the "Received-SPF" header indicates that the SPF lookup failed, as the domain bankofequity.co is not authorized to use the email server at 172.20.17.194 to send email messages. Furthermore, several of the headers contain suspicious-looking domains. For instance, the domain static.sprof.zvnx does not appear to have a legitimate top level domain ("zvnx") and the "Return-Path" header contains an email address that appears to be the result of random typing. The fact that the email address in the "Return-Path" header is not the same as the email address in the "From" header is not unusual and might not be suspicious in and of itself—this practice is common when sending emails to mailing lists. Also, the email address in the "From" header is user@bankofequity.co, but also gives the sender's name as "Felix".

Additionally, the email body itself is suspicious, as it contains spelling errors, poor grammar, improper punctuation, and unusual use of whitespace. The URL embedded in the email (http://www.bankofequity.co/wenf&23), may lead to a fake web site that emulates a real web site, and attempt to get the visitor to enter his or her credentials for the real web site. The attachment may be problematic as well, because it purports to be a zip file. Zip files, executable files, and other types of files are commonly used to distribute malware to the recipient's computing device. The user may download and run the file, which causes the malware to be installed on the computing device.

In and of themselves, each of these factors might or might not mean that the email message of displays 610 and 612 is a phishing attack. But the combination thereof strongly indicates that this is the case. Perhaps the most powerful indicator of the email message being a phishing attack is the failed SPF lookup shown in the "Received-SPF" header.

Nonetheless, phishing attacks can be difficult to differentiate from spam emails (e.g., unsolicited or junk emails). Unlike phishing attacks, spam emails are generally harmless attempts to sell goods or services, and do not try to obtain the recipient's sensitive private information. But determining whether a particular email message is legitimate, spam, or phishing can be a challenge to even today's sophisticated machine learning techniques. Email filtering software operated by an enterprise or an Internet service provider (ISP) can accurately detect some, but not all, phishing attacks. Thus, at least some fraction of phishing attacks will arrive in user's email inbox.

In order to mitigate the potential damage of phishing attacks that are delivered to users, enterprises may educate their employees on how to visually inspect email messages for characteristics of phishing. Employees may be encouraged to forward email messages containing suspected phishing attacks to a distinct email address for further analysis by a security professional.

As a result, the enterprise may be able to obtain an improved assessment of the prevalence and type of phishing attacks involving its employees. In doing so, the enterprise may be able to detect common phishing attacks, the impact of successful phishing attacks, and mitigate this impact. For instance, if a particular type of phishing attack has a distinct signature (e.g., a specific URL that leads to a fake web site or a specific attachment), the enterprise can add rules to its email filtering software so that these email messages containing these attacks are not delivered to the intended recipient. Alternatively or additionally, if a particular type of phishing attack installs particular malware on computing devices when successful, the enterprise may be able to identify which computing devices are infected, and take steps to eradicate the malware. This may involve updating anti-malware software on the computing devices, manually deleting files on the computing devices, editing configurations of the computing devices, and/or reformatting the disk drives and reinstalling the operating systems on the computing devices.

Thus, detection, containment, and eradication of problems caused by phishing attacks can take hours or days when performed by security professionals. But when addressing these attacks, time is of the essence. The longer the security professional takes to mitigate the impact of a phishing attack, the longer this attack is able to target additional users, and spread from infected computing devices. It is not uncommon for the complexity of determining the existence and extent of a phishing attack, as well as the time required to address it, to be so great that security problems caused by the attack can continue to spread despite mitigation efforts.

Thus, the embodiments herein are technical solutions to at least the technical problem of addressing phishing attacks in a rapid fashion. Furthermore, these solutions are fundamentally tied to computers and networking, as phishing attacks only exist in a computer networking environment.

VI. NETWORK ARCHITECTURE FOR ADDRESSING PHISHING ATTACKS IN MANAGED NETWORKS

Figure 7A:
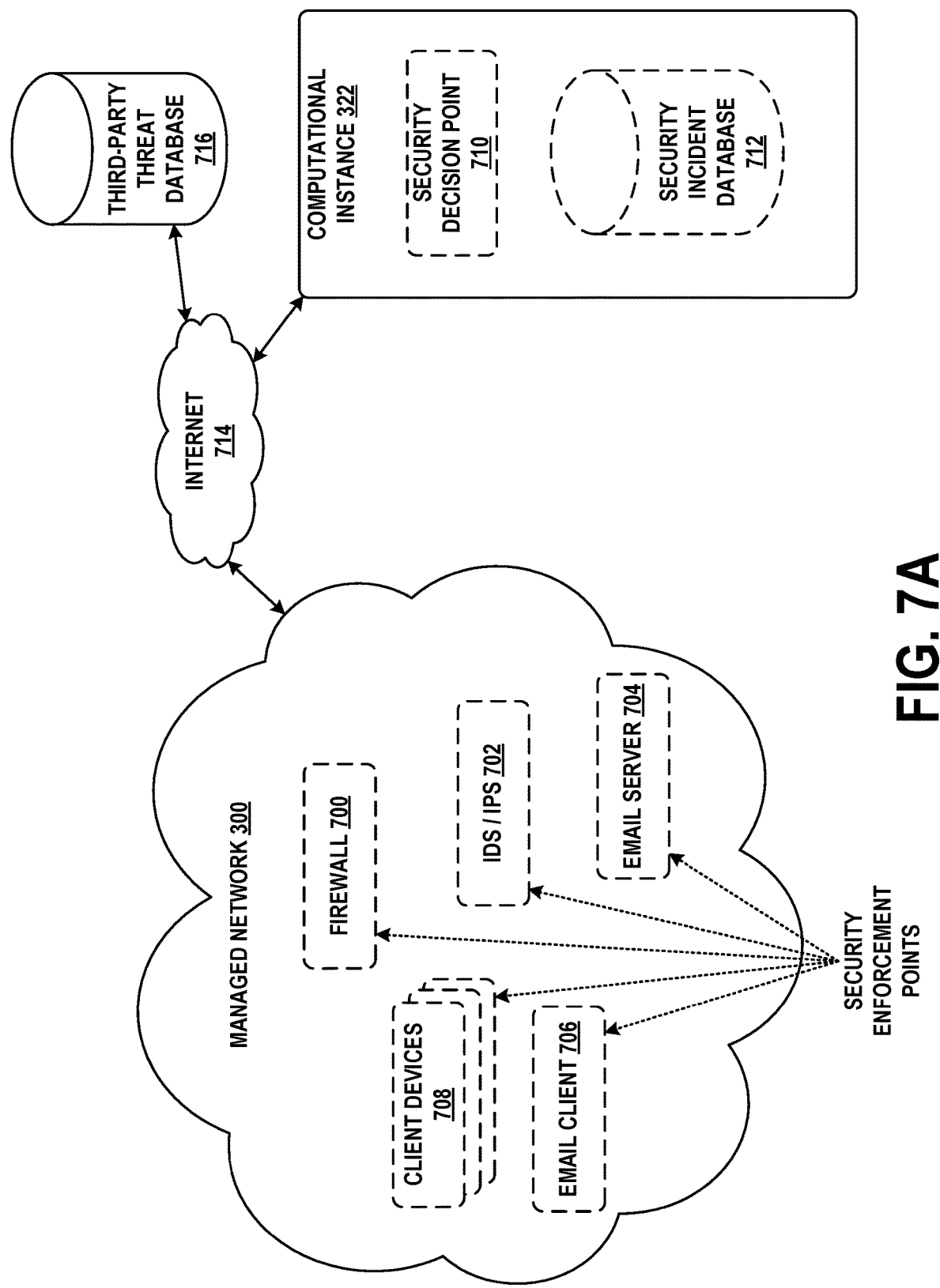
FIG. 7A is network architecture for security threat detection and mitigation, in accordance with example embodiments.

FIG. 7A depicts a network architecture that can provide automated security threat detection and mitigation, including threats related to phishing attacks. The architecture includes managed network 300 and computational instance 322, which can communicate with one another over internet 714 (which may be the public Internet, a private network, or any wide-area network). Third-party threat database 716 may also be communicatively coupled to internet 714.

Managed network 300 may include a number of devices, systems, and/or software applications, including those depicted as security enforcement points in FIG. 7A. These devices are firewall 700, intrusion detection system (IDS)/intrusion prevention system (IPS) 702, email server 704, email client 706, and client devices 708.

As noted above, a firewall, such as firewall 700, may be one or more specialized routers or server devices that protect managed network 300 from unauthorized attempts to access the devices, applications, and services therein, while allowing authorized communication.

IDS/IPS 702 may be a device or application that monitors a network (usually in a passive fashion) for malicious activity or policy violations. An IPS may include at least some capability to respond to detected threats. For instance, an IPS may be able to dynamically configure a firewall to block an attack or dynamically change the content of network traffic involved in the attack.

Email server 704 may be a device or software application that receives incoming mail and either forwards it to the recipient's computing device, or stores it in an inbox for the recipient to review or otherwise process. Email client 706 may be a device or software application that communicates with email server 704 to receive emails for one or more particular recipients. Email client 706 may also include user interface capabilities that can display received email messages in a fashion similar to display 600 and display 610, or in a different format. Email server 704 and email client 706 may communicate according to standardized or proprietary protocols.

Client devices 708 may include one or more computing devices intended for operation by users. For instance, these devices may be personal computers, laptops, tablets, smartphones, and so on. Client devices 708 may execute various types of anti-malware software, such as anti-virus applications, that attempt to detect, isolate, and remove malware that infects client devices 708. To do so, the anti-malware software may need to be periodically updated with signatures or other indications of new forms of malware.

Although not explicitly shown in FIG. 7A, any of firewall 700, IDS/IPS 702, email server 704, email client 706, and client devices 708 may include a spam filter software application. Such an application may attempt to detect unsolicited and/or unwanted email messages and prevent those messages from reaching the intended recipient's inbox. Email messages marked as spam may either be delivered to a spam folder instead of the inbox, or may be quarantined remotely. In some cases, spam filters can also detect certain types of phishing attacks, but the growing sophistication of these attacks results in at least some phishing attacks getting through the spam filter unscathed, and being delivered to a user's inbox.

Some spam filters use machine learning techniques to score email messages, and then use this score to decide whether these email messages should be categorized as spam. For example, email messages with suspicious headers, such as a failed SPF lookups, are scored such that future email messages with similarly suspicious headers are more likely to be categorized as spam. Likewise, email messages with certain keywords, phrases, or URLs in their bodies may also be scored such that they are more likely to be categorized as spam. Such a spam filter may, from time to time, be provided with examples of actual spam and non-spam in order to improve its classification capabilities.

Computational instance 322 may include a security decision point 710 and a security incident database 712. Security decision point 710 may be a device or software application that, on its own or with assistance from other entities, analyzes reports of suspected or actual phishing attacks to determine their characteristics and extent. Security incident database 712 may include records of such phishing attacks, and may serve as a repository for tracking these characteristics over time, as well as determining the extent of devices and/or users impacted.

Third-party threat database 716 may be a device and/or software application that stores feature vectors associated with particular observed security threats, including phishing attacks. Third-party threat database 716 may include APIs that are capable of receiving requests that specify one or more features of a feature vector and responsively providing a list of one or more security threats that are associated with the one or more features. In some cases, third-party threat database 716 may be accessible by way of internet 714, as shown in FIG. 7A. Alternatively, third-party threat database 716 may be located within computational instance 322 or remote network management platform 320 in general.

Figure 7B:
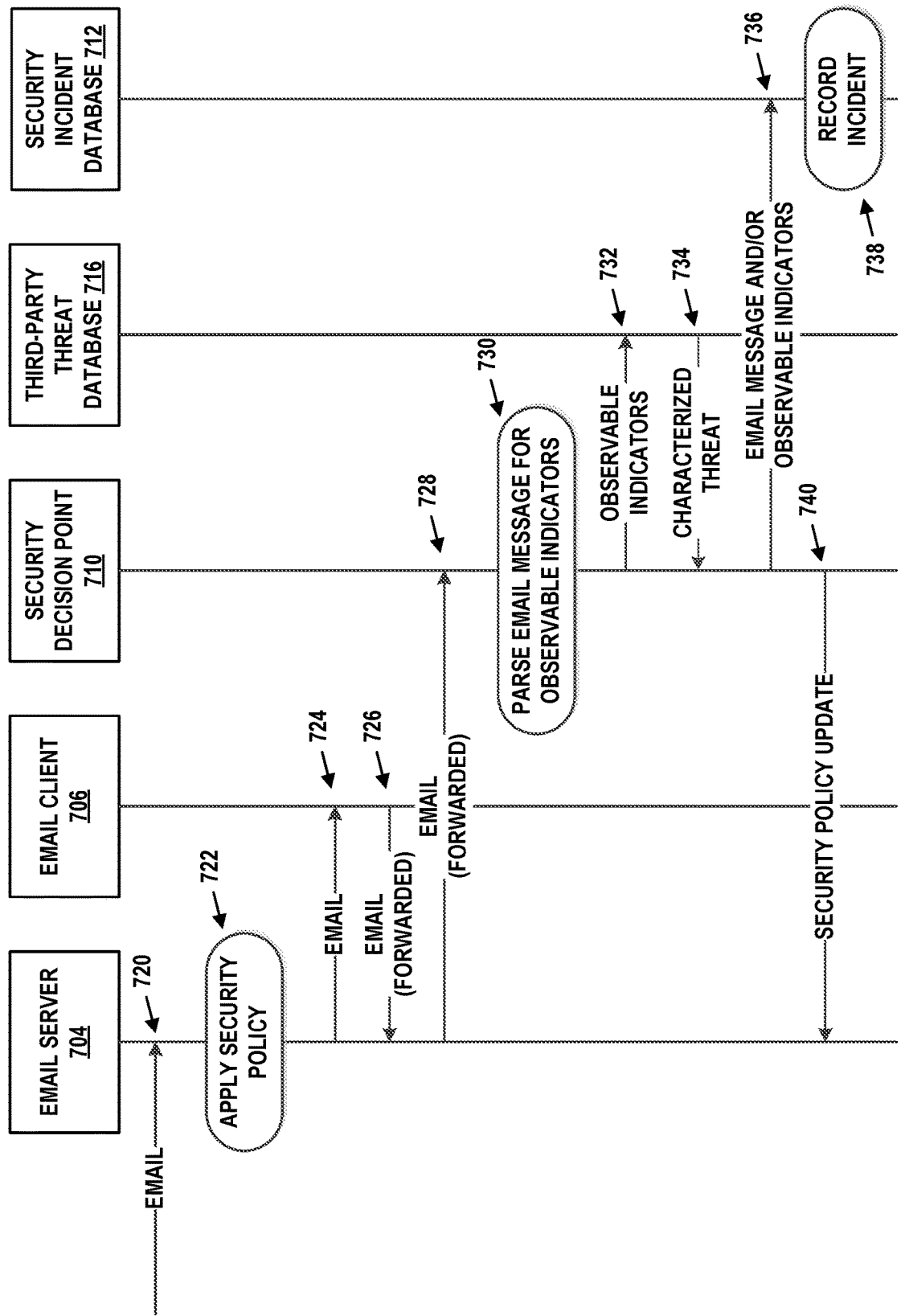
FIG. 7B is a message flow diagram, in accordance with example embodiments.

The operations of these components are further illustrated in the example of FIG. 7B. Particularly, FIG. 7B is a message flow diagram depicting detection and mitigation of a phishing attack.

At step 720, email server 704 receives an email message. For purpose of example, it is assumed that the email message contains a phishing attack. For instance, the email message may include header and body content the same as or similar to those depicted in FIG. 6B.

At step 722, email server 704 applies a security policy to the email message. The policy may be pre-defined, and may be a spam filter policy, for instance. As such, email server 704 may scan the headers and/or body of the email message. For instance, email server 704 may apply spam filtering techniques in order to classify the email message as either spam or non-spam. Phishing attacks may be considered to be spam by the spam filter policy.

For purpose of example, it is assumed that the email message is not classified as spam despite the phishing attack contained within. As noted above, this is not uncommon, as clever phishing attacks can closely resemble legitimate email messages.

In any event, at step 724, email server 704 transmits the email message to email client 706. There, it may be viewed by a human recipient. The human recipient, if well-informed, may suspect that the email message is a phishing attack. Accordingly, the human recipient may forward the email message to a designated email address and/or inbox associated with security decision point 710. As such, step 726 may involve the email message being sent to email server 704.

In an alternative embodiment, email server 704 or email client 706 may be able to automatically determine that the email message contains the phishing attack. Thus, either of these components may forward the email message to security decision point 710.

Regardless, at step 728, the forwarded email may arrive at security decision point 710. At step 730, security decision point 710 may parse the message for observable indicators of a phishing attack. Examples of observable indicators may include the putative sender and recipient of the email message, domain names and/or IP addresses of any email servers that were involved in transmission of the email message, URLs contained in the body of the email message, the file names of any attachments, and/or the output of applying a one-way hash function to each of these attachments.

Notably, using the hash function allows the file to be represented in a short, fixed-length format (a few bytes) so that the file itself does not need to be stored. Examples of hash functions include MD6 and SHA-3.

At step 732, security decision point 710 may transmit at least some of these observable indicators to third-party threat database 716. The observable indicators may be represented using a feature vector format.

In response, third-party threat database 716 may perform a lookup of the observable indicators against stored feature vectors. If there is a match between the observable indicators and one or more of the stored feature vectors, third-party threat database 716 may identify the observable indicators as signifying a threat. Accordingly, at step 734, a representation of the characterized threat may be transmitted to security decision point 710. This representation may be a numeric code, a text string, a binary identifier, or some other way of representing a threat.

An example feature vector may be in the format of an array of values, such as [<sender email address>, <recipient email address>, <domain name(s) of email server(s)>, <IP address(es) of email server(s)>, <URL(s) in email message(s)>, <file name(s) of attachment(s)>, <hash output(s) of attachment(s)>]. This is just one potential arrangement and other possibilities exist. In the case of the email message of FIG. 6B, the feature vector might be: ["user@bankofequity.co", "alice@company.com", "static-.sprof.zvnx", "172.20.17.194", "http://www.bankofequity.co/wenf&23", "P_187570_201708.zip", "A7FE71AED88F"].

In some cases, a feature vector will not contain entries for elements. For instance, if a suspected email phishing attack without a URL or attachment is processed, the last three elements of the feature vector may contain null, empty-string, or zeroed-out values. Accordingly, these elements might not be considered when matching the observable indicators to stored feature vectors. Furthermore, not all of the observable indicators provided need match all of the features in a feature vector in order for security decision point 710 to find a match. Security decision point 710 may classify threats based on partial matches. For instance, given the example feature vector above for the email message of FIG. 6B, any set of observable indicators including a URL of http://www.bankofequity.co/wenf&23 and attachment file name of P_187570_201708.zip may be considered to be associated with a phishing attack.

If security decision point 710 receives an indication from third-party threat database 716 that the provided observable indicators are associated with a threat (e.g., at step 734), security decision point may update both security incident database 712 and one or more devices on managed network 300.

For instance, at step 736, security decision point 710 may transmit a copy of the email message and/or its observable indicators to security incident database 712. In response, at step 738, security incident database 712 may store this information. By maintaining security incident database 712, security professionals may be able to rapidly determine the users and/or devices impacted by a newly-observed phishing attack. For instance, security incident database 712 may provide a graphical user interface that allows security professionals to search for observable indicators that were reported in the past. As an example, a security professional might search for previous incidents in which email messages contained the URL http://www.bankofequity.co/wenf&23. In the case that one or more are found, the security professional might check the users or devices involved with these previous incidents to determine whether the users accessed the URL and/or downloaded any associated attachments to their devices.

At step 740, security decision point 710 may transmit a security policy update to email server 704. This security policy update may instruct email server 704 to block any future incoming email messages that contain one or more observable indicators (e.g., email address, IP address, domain name, URL, attachment file name, or attachment hash value), where these observable indicators match those of the current email message. For example, email server 704 may prevent delivery of any email message containing the URL http://www.bankofequity.co/wenf&23 or having a putative sender of user@bankofequity.co. These messages may be archived for future reference or deleted.

In an alternative or additional embodiment not explicitly shown in FIG. 7B, a security policy update may be transmitted to firewall 700. Similar to the security policy update of step 740, this security policy update may instruct firewall 700 to block incoming email messages that contain one or more observable indicators (e.g., email address, IP address, domain name, URL, attachment file name, or attachment hash value), where these observable indicators match those of the current email message.

In another alternative or additional embodiment not explicitly shown in FIG. 7B, a security policy update may be transmitted to email client 706. This security policy update may instruct email client 706 to block incoming email messages that contain one or more observable indicators (e.g., email address, IP address, domain name, URL, attachment file name, or attachment hash value), where these observable indicators match those of the current email message.

In another alternative or additional embodiment not explicitly shown in FIG. 7B, a security policy update may be transmitted one or more of devices 708. This security policy update may instruct anti-malware applications executing on these devices to scan for the file P_187570_201708.zip or evidence that such a file has been downloaded or installed on the device. If these devices are executing endpoint firewall software, the security policy update may instruct the firewall software to block incoming email messages that contain one or more observable indicators (e.g., email address, IP address, domain name, URL, attachment file name, or attachment hash value), where these observable indicators match those of the current email message.

In another alternative or additional embodiment not explicitly shown in FIG. 7B, a security policy update may be transmitted to the device of IDS/IPS 702. This security policy update may instruct IDS/IPS 702 to flag, as security threats, incoming email messages that contain one or more observable indicators (e.g., email address, IP address, domain name, URL, attachment file name, or attachment hash value), where these observable indicators match those of the current email message.

In some embodiments, third-party threat database may specify that the observable indicators that it received at step 732 are not indicative of a phishing attack. In this case, the email message is most likely spam. Accordingly, security decision point 710 may transmit an update to a spam filter that is either part of email server 704, email client 706, or a separate entity not shown in FIG. 7B. This update may make it more likely that the spam filter prevents normal delivery of future email messages with these observable indicators (e.g., such email messages may be sent to the recipient's spam folder or quarantined elsewhere). In this way, recipients are less likely to forward an email message to security decision point 710 as a potential phishing attack when that email message merely is spam. As such, conclusions drawn by security decision point 710 are based on fewer "false positives" from users, and therefore are more likely to be accurate. Additionally, the load on security decision point 710 is reduced.

VII. EXAMPLE OPERATIONS

Figure 8:
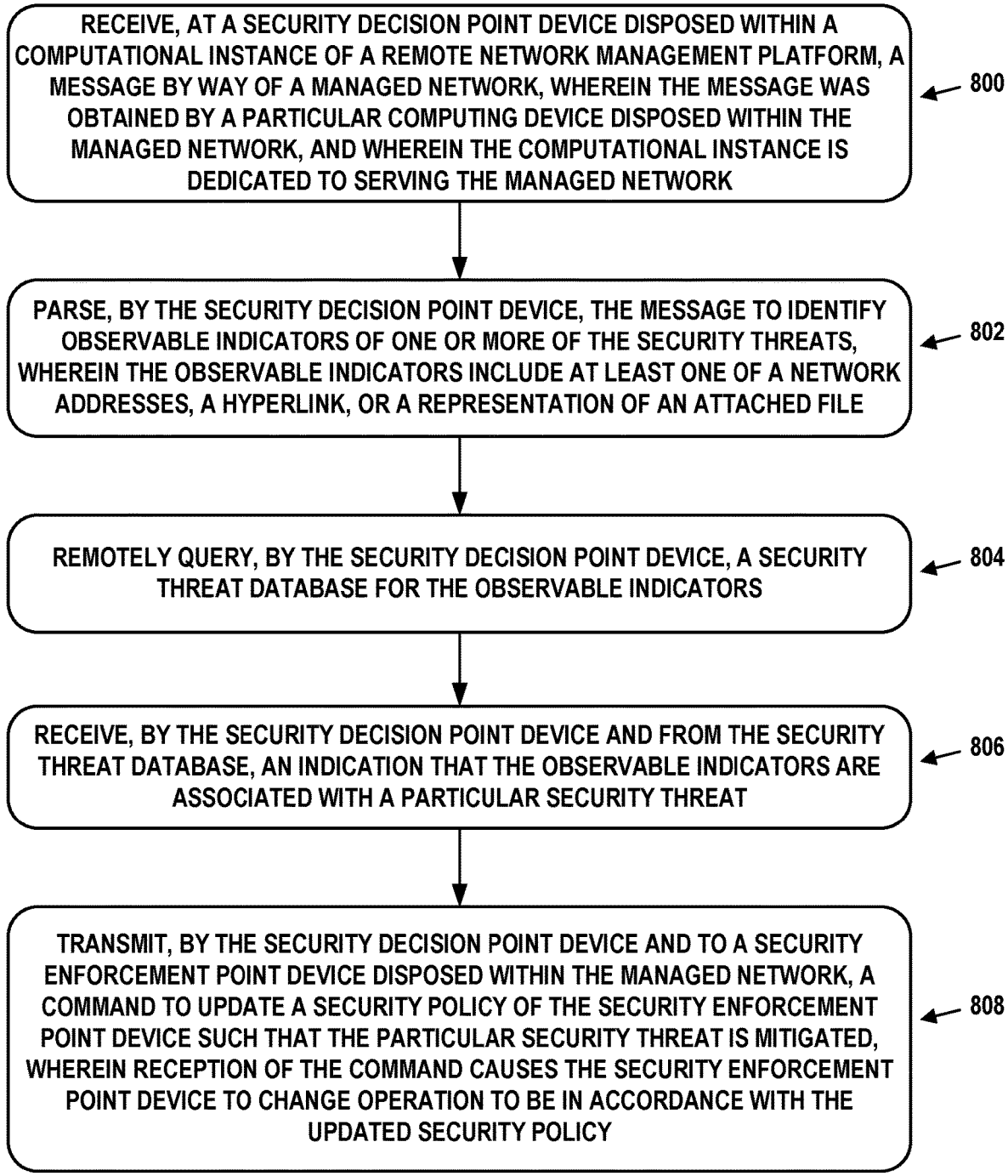
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve receiving, at a security decision point device disposed within a computational instance of a remote network management platform, a message by way of a managed network. The message may have been obtained by a particular computing device disposed within the managed network. The computational instance may be dedicated to serving the managed network.

Block 802 may involve parsing, by the security decision point device, the message to identify observable indicators of one or more of the security threats. The observable indicators may include at least one of a network addresses, a hyperlink, or a representation of an attached file. The network address may be, for example, an email address, a domain name, an IP address, or some other form of address.

Block 804 may involve remotely querying, by the security decision point device, a security threat database for the observable indicators.

Block 806 may involve receiving, by the security decision point device and from the security threat database, an indication that the observable indicators are associated with a particular security threat.

Block 808 may involve transmitting, by the security decision point device and to a security enforcement point device disposed within the managed network, a command to update a security policy of the security enforcement point device such that the particular security threat is mitigated. Reception of the command may cause the security enforcement point device to change operation to be in accordance with the updated security policy.

In some embodiments, the message is an email message containing the network address and the hyperlink. The network address may be contained within a header of the email message and may be an IP address from which the email message was sent. The hyperlink may be a URL contained within a body of the email message.

In some embodiments, the message is an email message containing the network address and the hyperlink. The network address may be contained within a header of the email message and may be a source email address. The hyperlink may be a URL contained within a body of the email message.

In some embodiments, the representation of the attached file is a hash that is computed by applying a one-way function to the attached file. In alternative embodiments, the representation of the attached file is a name of the attached file.

In some embodiments, the security enforcement point device is an email server device that receives email messages on behalf of the managed network. The updated security policy may cause the email device to prevent delivery of any of the received email messages that contain the network address, the hyperlink, or any file with characteristics that match the representation of the attached file.

In some embodiments, the security enforcement point device is an endpoint computing device on the managed network that is executing anti-malware software. The updated security policy may cause the anti-malware software to identify, when it appears in further email messages, the attached file as malware and quarantine the attached file.

In some embodiments, the security enforcement point device is a firewall device on the managed network. The updated security policy may cause the firewall to block incoming network traffic from the network address that contains the hyperlink or any file with characteristics that match the representation of the attached file.

In some embodiments, receiving the message by way of the managed network comprises receiving the message as a forwarded email from the particular computing device.

In some embodiments, the security decision point device is further configured to provide an alert that the particular security threat has been observed. In some embodiments, the security decision point device is further configured to store, in a security incident database disposed within the computational instance, a record of the particular security threat as observed, including at least one of the network addresses, the hyperlink, or the representation of the attached file.

In some embodiments, the message is an email message that contains the attached file, wherein the email message was received by an email server device associated with the managed network. The security decision point device may be further configured to query the email server device to determine a number of times that the attached file has been received by the email server device, a number of email accounts to which the attached file was delivered, and/or the email accounts to which the attached file was delivered. In some cases, this query may include other observables parsed from the phishing email like sender header values, subject header values, and domain names and URLs within the body.

In some embodiments, the security decision point device is further configured to: receive a second message by way of the managed network, wherein the second message is a second email message; parse the second message to identify second observable indicators of one or more of the security threats; remotely query the security threat database with the second observable indicators; receive, from the security threat database, a second indication that the second observable indicators are not associated with any of the security threats; and transmit, to an email spam filter associated with the managed network, the second message with an second indication that the second message is not spam. Reception of the second message and the second indication may cause the email spam filter to update its filtering rules. The second observable indicators may include at least one of a second network addresses, a second hyperlink, or a second representation of a second attached file.

These embodiments facilitate understanding the scope of the threat within the organization receiving the message. Further, they may be enhanced by searching an email server for similar messages, search log stores for similar messages, and by way of endpoint tools searching for a hash of any suspect file attachments. These techniques can help determine which users received the message and downloaded the attachments.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
    a security enforcement point device disposed within a managed network, wherein the security enforcement point device applies a security policy to protect computing devices on the managed network from security threats; and
    a security decision point device disposed within a computational instance of a remote network management platform, wherein the computational instance is dedicated to serving the managed network, and wherein the security decision point device is configured to:
        receive a message by way of the managed network, wherein the message was obtained by a particular computing device of the computing devices,
        parse the message to identify observable indicators of one or more of the security threats, wherein the observable indicators include at least one of a network address, a hyperlink, or a representation of an attached file,
        remotely query a security threat database for the observable indicators,
        receive, from the security threat database, an indication that the observable indicators are not associated with any security threats, and
        transmit, to the security enforcement point device, a command to update the security policy applied to future messages received at the security enforcement point device and that have the observable indicators, such that the future messages having the observable indicators are classified as spam and not forwarded to the security decision point application.

2. The system of claim 1, wherein the message is an email message containing the network address and the hyperlink, wherein the network address is contained within a header of the email message and is an Internet Protocol (IP) address from which the email message was sent, and wherein the hyperlink is a uniform resource locator (URL) contained within a body of the email message.

3. The system of claim 1, wherein the message is an email message containing the network address and the hyperlink, wherein the network address is contained within a header of the email message and is a source email address, and wherein the hyperlink is a uniform resource locator (URL) contained within a body of the email message.

4. The system of claim 1, wherein the representation of the attached file is a hash computed by applying a one-way function to the attached file.

5. The system of claim 1, wherein the representation of the attached file is a name of the attached file.

6. The system of claim 1, wherein receiving the message by way of the managed network comprises receiving the message as a forwarded email from the particular computing device.

7. The system of claim 1, wherein the message is an email message that contains the attached file, wherein the email message was received by an email server device associated with the managed network, and wherein the security decision point device is configured to:
query the email server device to determine a number of times that the attached file has been received by the email server device, a number of email accounts to which the attached file was delivered, or the email accounts to which the attached file was delivered.

8. The system of claim 1, wherein the security decision point device is configured to:
receive a second message by way of the managed network;
parse the second message to identify second observable indicators of one or more of the security threats, wherein the second observable indicators include at least one of a second network address, a second hyperlink, or a second representation of a second attached file;
remotely query the security threat database for the second observable indicators;
receive, from the security threat database, a second indication that the second observable indicators are associated with a particular security threat; and
transmit, to the security enforcement point device, a command to update the security policy such that the particular security threat is mitigated and that second future messages received at the security enforcement point device and that have the second observable indicators are blocked from being delivered.

9. The system of claim 8, wherein the security enforcement point device is an email server device that receives email messages on behalf of the managed network, and wherein the updated security policy causes the email server device to prevent delivery of any of the received email messages that contain the second network address, the second hyperlink, or any file with characteristics that match the second representation of the second attached file.

10. The system of claim 8, wherein the security enforcement point device is a firewall device on the managed network, and wherein the updated policy causes the firewall to block incoming network traffic from the second network address that contains the second hyperlink or any file with characteristics that match the second representation of the second attached file.

11. A method comprising:
receiving, at a security decision point device disposed within a computational instance of a remote network management platform, a message by way of a managed network, wherein the message was obtained by a particular computing device disposed within the managed network, and wherein the computational instance is dedicated to serving the managed network;
parsing, by the security decision point device, the message to identify observable indicators of one or more of the security threats, wherein the observable indicators include at least one of a network address, a hyperlink, or a representation of an attached file;
remotely querying, by the security decision point device, a security threat database for the observable indicators;
receiving, by the security decision point device and from the security threat database, an indication that the observable indicators are not associated with any security threats; and
transmitting, by the security decision point device and to a security enforcement point device disposed within the managed network, a command to update a security policy applied to future messages received at the security enforcement point device and that have the observable indicators, such that the future messages having the observable indicators are classified as spam and not forwarded to the security decision point application.

12. The method of claim 11, wherein the message is an email message containing the network address and the hyperlink, wherein the network address is contained within a header of the email message and is an Internet Protocol (IP) address from which the email message was sent, and wherein the hyperlink is a uniform resource locator (URL) contained within a body of the email message.

13. The method of claim 11, wherein the message is an email message containing the network address and the hyperlink, wherein the network address is contained within a header of the email message and is a source email address, and wherein the hyperlink is a uniform resource locator (URL) contained within a body of the email message.

14. The method of claim 11, comprising:
receiving, at the security decision point device, a second message by way of the managed network;
parsing, by the security decision point device, the second message to identify second observable indicators of one or more of the security threats, wherein the second observable indicators include at least one of a second network address, a second hyperlink, or a second representation of a second attached file;
remotely querying, by the security decision point device, the security threat database for the second observable indicators;
receiving, by the security decision point device and from the security threat database, a second indication that the second observable indicators are associated with a particular security threat; and
transmitting, by the security decision point device and to the security enforcement point device, a command to update the security policy such that the particular security threat is mitigated and that second future messages received at the security enforcement point device and that have the second observable indicators are blocked from being delivered.

15. The method of claim 14, wherein the security enforcement point device is an email server device that receives email messages on behalf of the managed network, and wherein the updated security policy causes the email server device to prevent delivery of any of the received email messages that contain the second network address, the second hyperlink, or any file with characteristics that match the second representation of the second attached file.

16. An article of manufacture including a non-transitory computer-readable medium, having stored thereon program instructions that, upon execution by a security decision point device disposed within a computational instance of a remote network management platform, cause the security decision point device to perform operations comprising:
receiving a message by way of a managed network, wherein the message was obtained by a particular computing device disposed within the managed network, and wherein the computational instance is dedicated to serving the managed network;
parsing the message to identify observable indicators of one or more of the security threats, wherein the observable indicators include at least one of a network address, a hyperlink, or a representation of an attached file;
remotely querying a security threat database for the observable indicators;

receiving, from the security threat database, an indication that the observable indicators are not associated with any security threats; and transmitting, to a security enforcement point device disposed within the managed network, a command to update a security policy applied to future messages received at the security enforcement point device and that have the observable indicators, such that the future messages having the observable indicators are classified as spam and not forwarded to the security decision point application.

17. The article of manufacture of claim 16, wherein the operations comprise:

receiving a second message by way of the managed network;

parsing the second message to identify second observable indicators of one or more of the security threats, wherein the second observable indicators include at least one of a second network address, a second hyperlink, or a second representation of a second attached file;

remotely querying the security threat database for the second observable indicators;

receiving, from the security threat database, a second indication that the second observable indicators are associated with a particular security threat; and transmitting, to the security enforcement point device, a command to update the security policy such that the particular security threat is mitigated and that second future messages received at the security enforcement point device and that have the second observable indicators are blocked from being delivered.

* * * * *